May 31, 1960     J. B. POLLET     2,938,309
DEBURRING AND POLISHING DEVICE
Filed Feb. 24, 1958
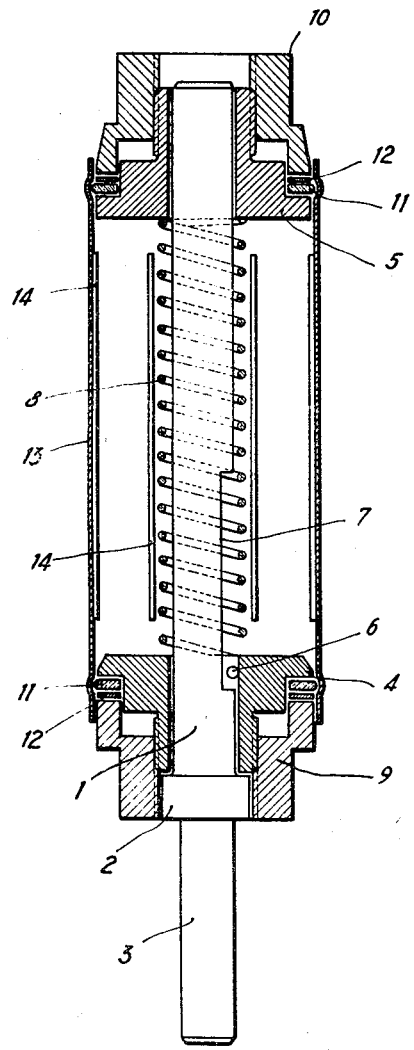
Inventor
Jean Baptiste Pollet
By
Watson, Cole, Grindle & Watson
Attorneys

United States Patent Office 2,938,309
Patented May 31, 1960

2,938,309
DEBURRING AND POLISHING DEVICE

Jean Baptiste Pollet, Paris, France, assignor to Societe Nationale d'Etude et de Construction de Moteurs d'Aviation, Paris, France, a company of France Filed Feb. 24, 1958, Ser. No. 717,153

Claims priority, application France Mar. 18, 1957

1 Claim. (Cl. 51—191)

This invention relates to a device for deburring and polishing the sides of pierced or punched apertures or cuttings in metal or other members or even of bores of a certain length. The device operates rapidly and satisfactorily and eliminates the conventional lengthy and expensive manual work involving a file or scraper.

The device mainly comprises a deformable cylinder which is of a diameter adapted to be inserted in the aperture to be polished, while the outer surface of said cylinder comprises, for instance, an encrustation of small abrasive grains and is adapted to provide the surface wear giving the polishing action, said cylinder being rigidly secured to two coaxial supports which are adapted for relatively rapid rotation and one of which can move axially relatively to the other. The centrifugal force applied to said cylinder therefore expands the same radially and gives it a barrel shape so that the cylinder rubs on the surface and edges of the aperture, removing burrs and providing an excellent polishing. The device can also round the edges of the aperture because of the expansion of the flexible abrasive surface.

The following description, taken in conjunction with the accompanying drawing, will make readily apparent the various features of the invention and the method of embodying the same, any step becoming apparent from the text and drawing being of course covered by the invention.

The single figure forming the drawing is an axial sectional view of an embodiment of a device according to the invention in its inoperative position.

In the example illustrated, the device comprises a spindle 1 having a shoulder 2 and terminating in a tailpiece 3 which projects outwards and which can be connected to drive means or to a flexible drive means for rotation of the spindle. Two members 4 and 5 are fitted to the spindle 1, the member 4 being slidable on said spindle but rotating solidly therewith because of a key 6 sliding in a groove 7 in said spindle, whereas the member 5 is rigidly secured to said spindle. A coil spring 8 disposed around the spindle tends to maintain the member 4 in the position illustrated in the drawing, in which the member 4 is in abutting relationship with the shoulder 2.

Screwed to each member 4 and 5 is a nut 9, 10 for clamping, through the agency of a disc 12, a flexible ring 11, for instance of rubber, between the nut and the corresponding member 4 or 5. A cylindrical sheath 13 of abrasive cloth is threaded on to the members 4 and 5 and the corresponding nuts 9, 10. When the nuts are tightened, the rubber rings 11 are expanded radially and bear firmly against the inner surface of the sheath 13 so that the two ends thereof engage firmly with the members 4 and 5. When the spindle 1 is rotated about itself, it drives the members 5 and 4, the latter through the agency of the sliding key 6. The sheath 13 is also rotated by the rubbing of the rubber rings 11. The sheath 13 is therefore subjected to a centrifugal force which tends to give it an arcuate or barrel shape which is outwardly convex, such deformation of the sheath being accompanied by a sliding of the members 4 and 9 on the spindle towards the member 5 and against the spring 8.

It will therefore be apparent that if the device is rotated when introduced into an aperture of a diameter slightly greater than the diameter of the sheath 13 when the same is in the inoperative state, the sheath 13 will expand and rub against the inner wall of the aperture which is thus attacked by the abrasive cloth, although the flexibility thereof enables it to adapt itself intimately to the shape of the aperture. If the device is reciprocated axially of the aperture, the expanded part of the rotating abrasive cloth can be applied alternately to both sides of the aperture. Burrs are thus removed and an excellent polish is finally produced.

The sheath 13 can be formed with lengthwise slots 14 to help its expansion by centrifugal force.

During working the speed of rotation can be reduced or increased to control the expansion of the sheath 13, such expansion depending upon the speed of rotation.

The abrasive cylinder 13 can readily be replaced by slackening the nuts 9 and 10, since it is secured by the friction of the rubber rings 11.

What is claimed is:

A deburring and polishing device, comprising two coaxial rotary supports axially movable relatively to one another, spring means for urging said supports apart, drive means for rotating one of said supports, and an abrasive member of generally cylindrical shape and flexible material, said member having a plurality of longitudinally-extending slots distributed therearound and being secured at both ends to said supports.

References Cited in the file of this patent

UNITED STATES PATENTS

| | | |
|---|---|---|
| 493,002 | Webster | Mar. 7, 1893 |
| 573,734 | Webster | Dec. 22, 1896 |
| 966,685 | Harrington | Aug. 9, 1910 |
| 2,225,073 | Miller | Dec. 17, 1940 |
| 2,671,297 | Arms | Mar. 9, 1954 |